United States Patent [19]

Trapasso

[11] 4,011,393
[45] Mar. 8, 1977

[54] POLYGALACTOMANNAN GUM FORMATE ESTERS

[75] Inventor: Louis E. Trapasso, Watchung, N.J.

[73] Assignee: Celanese Corporation, New York, N.Y.

[22] Filed: Apr. 28, 1975

[21] Appl. No.: 572,049

[52] U.S. Cl. .............................. 536/114; 536/119
[51] Int. Cl.² ....................................... C08B 37/00
[58] Field of Search ............. 260/234 R; 210/23 H; 536/119, 114

[56] References Cited

UNITED STATES PATENTS 3,580,841  5/1971  Cadotte et al. .................. 210/23 H

OTHER PUBLICATIONS

Fieser et al., "Reagents for Organic Chem. (Synthesis)", Wiley and Sons, Inc., New York, 1967, p. 404.

*Primary Examiner*—Lewis Gotts
*Assistant Examiner*—Cary Owens

[57] ABSTRACT

This invention provides novel guar gum formate esters having a degree of substitution between about 0.01 and 3.0, and further provides a process for producing guar gum formate esters by the interaction of guar gum powder or guar gum splits with concentrated formic acid. The invention process represents a general method for formylation of polygalactomannan gums. The polygalactomannan gum formate esters are useful as flocculants, and as sizing agents for paper and textiles.

4 Claims, No Drawings

POLYGALACTOMANNAN GUM FORMATE ESTERS

BACKGROUND OF THE INVENTION

The polygalactomannans are polysaccharides composed principally of galactose and mannose untis and are usually found in the endosperm of leguminous seeds, such as guar, locust bean, honey locust, flame tree, and the like. Guar flour, for example, is composed mostly of a galactomannan which is essentially a straight chain mannan with single membered galactose branches. The mannose units are linked in a 1-4-$\beta$-glycosidic linkage and the galactose branching takes place by means of a 1–16 linkage on alternate mannose units. The ratio of galactose to mannose in the guar polymer is, therefore, one to two. Guar gum has a molecular weight of about 220,000.

Locust bean gum is also a polygalactomannan gum of similar molecular structure in which the ratio of galactose to mannose is one to four. Guar and locust bean gum are the preferred sources of the polygalactomannans, principally because of the commercial availability thereof.

Polygalactomannan gums swell readily in cold water and can be dissolved in hot water to yield solutions which characteristically have a high viscosity even at a concentration of 1–1.5 percent. Guar gum and locust bean gum as supplied commercially usually have a viscosity (at 1% concentration) of around 1000 to 4000 centipoises at 25° C. using a Brookfield Viscometer Model LVF, spindle No. 2 at 6 rpm.

For a number of commercial applications it is advantageous to have a gum that provides a solution viscosity lower than that imparted by the same gum in the form in which it is ordinarily sold commercially. Thus, for various food products wherein a polygalactomannan is incorporated as a thickener or is used in a gel or jelly-type product, it is desirable to employ a gum which has a one percent solution viscosity between about 1000 to 2000 centipoises at 25° C. Solutions having lower viscosities than those produced with conventional commercial gum are also advantageous in paper making procedures, either in the beater or when used as a sizing. Low viscosity solutions of polygalactomannan gums also find special application in the sizing and printing of textiles.

Further, polygalactomannan gums have found application in chemotherapeutic regimens. U.S. Pat. No. 3,313,800 discloses that guar gum has been used for the treatment of certain physiological disorders of the gastro-intestinal tract. Also it has been found effective in treatment of hypercholesteremia. The ordinary dose for humans for hyperchlosteremia is from 3 to 5 grams taken three to four times a day. When it is attempted to incorporate the guar gum into an aqueous medium, the gum hydrates so rapidly that the product soon sets to a semi-solid mass which is not palatable and which is not accepted by human patients. Suspensions of the gum in non-aqueous media such as glycerin have failed to provide a suitable dosage form, as they resulted in adherence of the gum to the oral or tracheal mucosa with subsequent discomfort and difficulty in swallowing and breathing.

It has also been proposed to encapsulate finely divided guar gum into gelatin capsules. This dosage form has the disadvantage of requiring the patient to swallow 4 or 5 large capsules at a time. However, a more important drawback is that when the capsules are swallowed the gastric juices dissolve the gelatin and begin to hydrate the outside of the gum contained therein, forming a hydrated shell, which acts as a barrier to further penetration and which results in imperfect use of the guar gum. The same problem is presented by tablets and, as a result, neither of these methods of incorporation have proven to be practical.

It is desirable to provide modified guar gum which disperses readily in aqueous media and which hydrates sufficiently slow so that an aqueous media dispersion remains fluid for a period between about 15 and 45 minutes and is adequate for oral use.

There is also need for novel polysaccharidic derivatives which have properties uniquely adapted for highly specialized application as ultrathin semipermeable reverse osmosis membranes. U.S. Pat. No. 3,580,841 describes the disadvantages of conventional semipermeable membranes when employed in the purification of saline water by reverse osmosis. A superior semipermeable membrane must possess a favorable selectivity to the desired product solvent and a high degree of rejection toward the solute. Such membrane should also be coherent, structurally stable, and permit a minimum of viscous flow under reverse osmosis conditions.

Accordingly, it is an object of the present invention to provide polygalactomannan gum derivatives which exhibit solution viscosities that are lower than those imparted by the same gums in the conventional commercial forms.

It is another object of the present invention to provide guar gum esters which are slowly hydratable and readily dispersible in water.

It is a further object of the present invention to provide a novel class of polygalactomannan gum formate esters.

It is still another object of the present invention to provide one or more processes for producing polygalactomannan gum formate esters.

Other objects and advantages shall become apparent from the following description and examples.

DESCRIPTION OF THE INVENTION

One or more objects of the present invention are accomplished by a process which comprises dissolving polygalactomannan gum in concentrated formic acid and maintaining the solution at a temperature between about 0° C and 60° C. for an esterification reaction period sufficient to achieve a degree of substitution by formate groups between about 0.01 and 3.0.

Whenever the following description refers specifically to guar gum, it is understood that the disclosure is applicable to other closely related polygalactomannan gums in general, and locust bean gum in particular.

By the term "degree of substitution" as employed herein is meant the average substitution of formate ester groups per anhydro sugar unit in the polygalactomannan gums. In guar gum, the basic unit of the polymer consists of two mannose units with a glycosidic linkage and a galactose unit attached to a hydroxyl group of one of the mannose units. On the average, each of the anhydro sugar units contains three available hydroxyl sites. A degree of substitution of three would mean that all of the available hydroxyl sites have been esterified with formate ester groups.

By the term "ultrathin" as employed herein in reference to semipermeable membranes is meant a thickness between about 0.1 and 10 microns.

The formylation processes of the present invention are applicable to polygalactomannan gums in the form of finely divided powders or in the form of gum "splits".

Guar gum and other polygalactomannan hydrocolloids are derived from certain seeds of the plant family "leguminosae". The seeds are composed of a pair of tough, non-brittle endosperm sections referred to as "splits", between which is sandwiched a brittle embryo layer. The entire structure is enclosed in a tough seed coat.

The endosperm splits are extremely tough and non-brittle. This renders them difficult to reduce into a finely divided state. One method of separating the endosperm splits is described in U.S. Pat. No. 3,132,681. Methods of reducing endosperm splits into finely divided powder are described in U.S. Pat. No. 2,891,050; U.S. Pat. No. 3,455,899; and references cited therein.

Illustrative of the present invention process disclosed hereinabove, guar gum powder is dissolved in concentrated formic acid (i.e., 97% concentration) at a temperature between about 0° C and 60° C. A preferred temperature range in between about 20° C and 30° C.

The concentration of the guar gum in the formic acid solution usually is below about 5 weight percent, and for convenience and ease of handling preferably in the range between about 1–2 weight pecent.

The concentrated formic acid can be essentially anhydrous (i.e., commercial 97% formic acid) or it can be diluted with up to about 25 weight percent water. If more dilute solutions of formic acid are employed, the rate of the esterification reaction is slowed considerably and the degree of substitution approaches 2 rather than 3.

Once the guar gum is contacted with concentrated formic acid, there is an immediate initiation of the esterification of available hydroxyl sites with formate groups. The degree of substitution is time dependent. As illustrated in Example I hereinbelow, a 1% solution of guar gum in 97% formic acid has a degree of substitution of about 1 after four hours of esterification time, and a degree of substitution of nearly 3 after 24 hours reaction time. If guar gum splits are employed, the reaction rate is slower because the splits require a longer period to dissolve in the formic acid as compared to the powdered form of the gum.

Recovery of polygalactomannan gum formate ester from the reaction mixture can be accomplished by diluting the reaction mixture with a water-miscible solvent such as a lower alkanol and thereby precipitating the gum formate ester. The precipitated product is easily recoverable by filtration, followed by alkanol washes and drying.

As an important embodiment of the present invention, it has been discovered that polygalactomannan gum can be converted into formate ester derivatives in an advantageous manner by contacting solid polygalactomannan gum with formic acid in a heterogeneous reaction system. This improved method for producing polygalactomannan gum formate esters comprises contacting solid polygalactomannan gum (undissolved) with concentrated formic acid solution, and a fluid organic medium which is a solvent for formic acid and essentially a non-solvent for polygalactomannan gum at a temperature of about 30° C. The reaction mass is stirred rapidly in the form of a slurry.

The fluid organic medium can be any organic liquid which is inert under the esterification reaction conditions and which exhibits the required solubility characteristics. A particularly preferred category of organic media are aromatic hydrocarbon solvents such as benzene, toluene, xylene, and the like, and including related substituted aromatic derivatives such as chlorobenzene, nitrobenzene, and the like. The organic solvent can constitute as little as 5 weight percent of the total reaction medium, or as much as 95 weight percent and higher. Example III hereinbelow illustrates the range of quantities of organic solvents and reactants which can be employed.

In the improved process, the solid polygalactomannan gum (powder or splits) remains undissolved throughout the course of the reaction. The degree of substitution is precisely controlled by introducing a calculated quantity of formic acid into the reaction system. A sufficient reaction time is allowed to permit the esterification reaction to achieve the predetermined degree of substitution.

The advantages of the improved process are manifold. The formylation reaction proceeds readily and with little or no degradation of the polygalactomannan gum. Small quantities of formic acid are employed, and the need to dispose of excess concentrated formic acid solution as waste is eliminated. Further, the polygalactomannan gum formate ester product of the process if recovered by a simple filtration procedure.

It is important to note that a polygalactomannan gum formate ester such as guar gum formate ester is water soluble when the degree of substitution is up to about 0.5. Guar gum formate esters are water insoluble at 25° C. when the degree of substitution is between about 0.5 and 3.0. The degree of water solubility of a polygalactomannan gum formate ester is an essential consideration for the purposes of utilizing the gum formate ester in specific, highly specialized end-uses.

The novel polygalactomannan gum formate esters of the present invention are highly suitable for a variety of applications. There are useful as flocculants, and have process advantages over unmodified polygalactomannan gums in the sizing of paper and textiles.

Further, the present invention polygalactomannan gum formate esters having a degree of substitution between about 0.01 and 1.0 are slowly hydratable. In accordance with the prior art, this suggests the use of polygalactomannan gum formate esters in the treatment of hypercholesteremia, and as adjuvants in slow-release medicaments in dosage unit form.

In Example IV there is illustrated the use of guar gum formate ester in the production of an ultrathin semipermeable membrane. U.S. Pats. Nos. 3,133,132; 3,133,137; and 3,170,867 are representative of the prior art of semipermeable membranes useful in reverse osmosis processes. In a manner similar to modified cellulose acetate membranes, the semipermeable membranes of the present invention are capable of high solute rejection and high solvent throughput. The membranes preferably have a thickness of between about 0.1 and 10 microns.

The following examples are illustrative of the present invention.

EXAMPLE I

Guar gum is purified in the following manner.

Guar gum is extracted with methanol to remove methanol-soluble oils. The guar gum so treated is wetted with isopropanol, then sufficient water is added slowly to form a 0.5% solution. After standing overnight, the solution is centrifuged at 8000 rpm for 30 minutes. The clear supernatant is decanted from the insoluble residue and filtered through glass fiber filter paper.

The filtrate solution is diluted with ethanol to precipitate the guar gum. The precipitate is filtered, dried, and ground in a Wiley mill through a 40 mesh screen.

The purified guar gum powder has less than 0.1% nitrogen content, and about 0.48% ash content.

EXAMPLE II

Guar gum formate ester is prepared in the following manner.

At room temperature purified guar gum powder is dissolved in 97% formic acid to form a 1% solution of guar gum.

The formation of formate ester commences immediately upon contact of the guar gum with the formic acid.

The degree of substitution depends on the residence time of the guar gum in the formic acid reaction medium.

| Sample Number | Reaction Time Hours | Brookfield Viscosity 1%, CPS | % Combined Formic Acid Sap. Value |
|---|---|---|---|
| 1. | 4 | 400 | 28 |
| 2. | 21 | — | 42 |
| 3. | 24 | 250 | 44 |
| 4. | 72 | 20 | 43 |
| 5. | 4 | (partially dissolved splits) | 13 |

The theoretical saponification values for monoformate, diformate and triformate are 22.12%, 36.22% and 46%, respectively.

EXAMPLE III

Guar gum formate ester can be produced with a controlled degree of substitution in the following manner.

Purified guar gum powder (16.2 grams), toluene or benzene (100 grams) and a specific quantity of 97% formic acid (as designated hereinbelow) are mixed together and stirred as a slurry for a period of 3.5 hours. The slurry is allowed to stand overnight, and the guar gum formate solids are recovered by filtration, washed three times with methanol, and dried.

| Sample Number | Concentration Of Formic Acid Grams | % Combined Formic Acid, Sap. Value | Brookfield Viscosity 1%, CPS |
|---|---|---|---|
| 5. | 3.24 | 3.1 | 5500 |
| 6. | 6.48 | 6.4 | 3900 |
| 7. | 12.96 | 10.0 | 3600 |
| 8. | 19.44 | 13.0 | 2950 |
| 9. | 25.92 | 17.0 | — |
| 10. | 32.4 | 21.0 | — |
| 11. | 38.88 | 23.0 | — |
| 12. | 45.36 | 24.0 | — |
| 13. | 51.84 | 25.0 | — |

If the pH of a slurried guar gum formate mixture is shifted from acid to slightly alkaline by the addition of base, then the guar gum formate ester slowly hydrolyzes, and the reaction medium exhibits a corresponding slowly increasing viscosity.

EXAMPLE IV

This example illustrates the use of guar gum formate ester for the production of ultrathin semipermeable membranes.

One gum of guar gum formate ester (D.S. of 2.8) is dissolved in 25 grams of cyclohexanone and the solution is cast on water at room temperature. The cyclohexanone is permitted to evaporate and the residual guar gum formate ester forms a ultrathin membrane floating on the surface of the water. The membrane has a thickness of less than one micron.

The ultrathin membrane so formed is laminated to a cellulose acetate porous support membrane in the manner described in U.S. Pat. No. 3,580,841.

Guar gum formate esters exhibit different selectivity and other different properties than guar gum triacetate in reverse osmosis processes, and therefore represent an alternate type of ultrathin membrane for advantageous application in reverse osmosis processes.

What is claimed is:

1. A process for producing polygalactomannan gum formate esters which consists essentially of contacting solid polygalactomannan gum with concentrated formic acid solution, and a fluid organic medium which is a solvent for formic acid and essentially a non-solvent for solid polygalactomannan gum at a temperature between 0° and 60° C., and wherein the contact time is for a period sufficient to provide a predetermined degree of substitution by formate groups in the polygalactomannan gum.

2. A process in accordance with claim 1 wherein the polygalactomannan gum is guar gum or locust bean gum.

3. A process in accordance with claim 1 wherein the fluid organic medium is an aromatic hydrocarbon solvent.

4. A process in accordance with claim 3 wherein the aromatic hydrocarbon solvent is benzene or toluene.

* * * * *